(12) United States Patent
Fukui et al.

(10) Patent No.: US 9,976,465 B2
(45) Date of Patent: May 22, 2018

(54) EXHAUST PURIFIER

(71) Applicant: YANMAR CO., LTD., Osaka-shi (JP)

(72) Inventors: Yoshinori Fukui, Osaka (JP); Toshihisa Kanda, Osaka (JP); Yasuyuki Takahata, Osaka (JP); Shunji Hamaoka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days. days.

(21) Appl. No.: 15/321,167

(22) PCT Filed: Jun. 26, 2015

(86) PCT No.: PCT/JP2015/068538
§ 371 (c)(1),
(2) Date: Dec. 21, 2016

(87) PCT Pub. No.: WO2016/002661
PCT Pub. Date: Jan. 7, 2016

(65) Prior Publication Data
US 2017/0145889 A1    May 25, 2017

(30) Foreign Application Priority Data

Jun. 30, 2014  (JP) .................................. 2014-135322

(51) Int. Cl.
*F01N 3/22* (2006.01)
*B01D 53/94* (2006.01)
*B01J 38/12* (2006.01)

(52) U.S. Cl.
CPC ......... *F01N 3/225* (2013.01); *B01D 53/9418* (2013.01); *B01J 38/12* (2013.01)

(58) Field of Classification Search
None
See application file for complete search history.

(56) References Cited

U.S. PATENT DOCUMENTS

| 5,725,618 A | 3/1998 | Shimoda et al. |
| 2013/0047582 A1* | 2/2013 | Gonze ................... F01N 3/2013 60/274 |

FOREIGN PATENT DOCUMENTS

| EP | 3121401 A1 | 1/2017 |
| JP | H03-130522 A | 6/1991 |

(Continued)

OTHER PUBLICATIONS

Hori, Y.—JP2003155911A—translated document. (2003).*

(Continued)

*Primary Examiner* — Walter D Griffin
*Assistant Examiner* — Jelitza Perez
(74) *Attorney, Agent, or Firm* — Knobbe, Martens, Olson & Bear, LLP

(57) ABSTRACT

The purpose of the present invention is to provide an exhaust purifier which suppresses unnecessary consumption of pressurization air so as to improve a removal rate of dust. An exhaust purifier for removing particulate matter adhered to a NOx catalyst by injecting pressurized air using an air injection nozzle into a housing of a catalyst reactor in which the NOx catalyst serving as a catalyst is positioned, wherein an injection valve of a soot blower supplying pressurized air into the housing of the catalyst reactor is opened and closed based on an exhaust gas flow rate so as to inject the pressurized air.

3 Claims, 12 Drawing Sheets

(56) References Cited

FOREIGN PATENT DOCUMENTS

| | | | |
|---|---|---|---|
| JP | H08-126817 A | | 5/1996 |
| JP | H09-112248 A | | 4/1997 |
| JP | 2003-155911 A | | 5/2003 |
| JP | 2003155911 A | * | 5/2003 |
| JP | 2005-201061 A | | 7/2005 |
| JP | 2013-164078 A | | 8/2013 |
| WO | 2010/092855 A1 | | 8/2010 |
| WO | 2014/014099 A1 | | 1/2014 |
| WO | 2014/104099 A1 | | 7/2014 |
| WO | 2016/147649 A1 | | 9/2016 |

OTHER PUBLICATIONS

Extended European Search Report dated Dec. 14, 2017 for Application No. 15815012.8 in 7 pages.
Extended European Search Report dated Dec. 12, 2017 for Application No. 15815313.0 in 8 pages.
Notification of Reasons for Refusal dated Sep. 12, 2017 for JP Application No. 2014-135321 in 5 pages (including translation).

* cited by examiner

EXHAUST PURIFIER

CROSS-REFERENCE TO RELATED APPLICATIONS

This application is the U.S. National Phase under 35. U.S.C. § 371 of International Application PCT/JP2015/068538, filed Jun. 26, 2015, which claims priority to Japanese Patent Application No. 2014-135322, filed Jun. 30, 2014. The disclosures of the above-described applications are hereby incorporated by reference in their entirety.

TECHNICAL FIELD

The present invention relates to an exhaust purifier of an internal combustion engine.

BACKGROUND ART

Conventionally, an exhaust purifier which reduces NOx to nitrogen and water with a catalyst reactor in which a selective reduction NOx catalyst (SCR catalyst) is arranged and ammonia which is a reducing agent so as to decrease NOx (nitrogen oxide) included in exhaust gas from an internal combustion engine is known. The ammonia is generated by urea water injected to exhaust gas with high temperature and contacts the NOx catalyst so as to reduce NOx to nitrogen and water.

In the exhaust purifier, a material having a carrier of oxides, such as Ti including active ingredients, such as V and Cr which is formed to be a honeycomb structure in which many through holes are formed is used as the NOx catalyst of the catalyst reactor. According to the configuration, a contacting area is increased so as to promote a reduction reaction. On the other hand, when exhaust gas passes through the through holes, dust included in the exhaust gas may adhere to the NOx catalyst and close the holes so as to lower the reduction reaction. Accordingly, there is an art in which compressed air is injected to a NOx catalyst so as to remove dust adhering to the NOx catalyst and suppress adhesion of dust. For example, an art described in the Patent Literature 1 is so.

In a catalyst reactor (reactor) of an exhaust purifier (exhaust denitration device) described in the Patent Literature 1, if needed, compressed air is injected from an injection nozzle toward a NOx catalyst so as to hit dust adhering to the NOx catalyst, thereby removing the dust. Generally, the exhaust purifier is configured so that compressed air is injected periodically based on operation time of an engine. Namely, in the exhaust purifier, the compressed air is injected without considering an adhesion state of dust in the NOx catalyst. Accordingly, there is a problem that in the exhaust purifier, the compressed air is vainly consumed by unnecessary injection of the compressed air.

PRIOR ART REFERENCE

Patent Literature

Patent Literature 1: the Japanese Patent Laid Open Gazette H8-126817

DISCLOSURE OF INVENTION

Problems to be Solved by the Invention

The present invention is provided for solving the problems mentioned above, and the purpose of the invention is to provide an exhaust purifier which suppresses unnecessary consumption of compressed air so as to improve a removal rate of dust.

Means for Solving the Problems

The problems to be solved by the present invention have been described above, and subsequently, the means of solving the problems will be described below.

According to the present invention, in an exhaust purifier wherein compressed air is injected into a catalyst reactor in which a catalyst is arranged so as to remove dust adhering to the catalyst, the compressed air is injected into the catalyst reactor based on an exhaust gas flow rate.

According to the present invention, when the exhaust gas flow rate is not more than a reference exhaust gas flow rate, the compressed air is injected into the catalyst reactor at a predetermined condition.

According to the present invention, when a pressure difference between exhaust gas upstream the catalyst and exhaust gas downstream thereof is raised higher than a pressure difference between exhaust gas upstream the catalyst and exhaust gas downstream thereof at an initial state at the same exhaust flow rate for not less than a reference pressure difference raising amount, the compressed air is injected into the catalyst reactor at a condition different from the predetermined condition regardless of the exhaust gas flow rate.

Effect of the Invention

The present invention brings the following effects.

According to the present invention, the compressed air is injected at a mode at which dust is removed efficiently based on an operation state of an internal combustion engine. Accordingly, unnecessary consumption of the compressed air can be suppressed so as to improve a removal rate of the dust.

According to the present invention, the compressed air is injected only in the state in which removal of the dust by power of exhaust gas is not expected. Accordingly, the unnecessary consumption of the compressed air can be suppressed so as to improve the removal rate of the dust.

According to the present invention, a condition of injection of the compressed air is changed corresponding to an adhesion amount of the dust. Accordingly, the unnecessary consumption of the compressed air can be suppressed so as to improve the removal rate of the dust.

DETAILED DESCRIPTION OF THE INVENTION

Below, referring to FIGS. 1 to 4, an exhaust purifier 1 which is a first embodiment of an exhaust purifier according to the present invention is explained. In this embodiment, an "upstream side" means an upstream side in a flow direction of fluid, and a "downstream side" means a downstream side in the flow direction of the fluid. The exhaust purifier 1 is not limited to this embodiment and may alternatively be airless type which does not use pressurized air.

Figure 1:
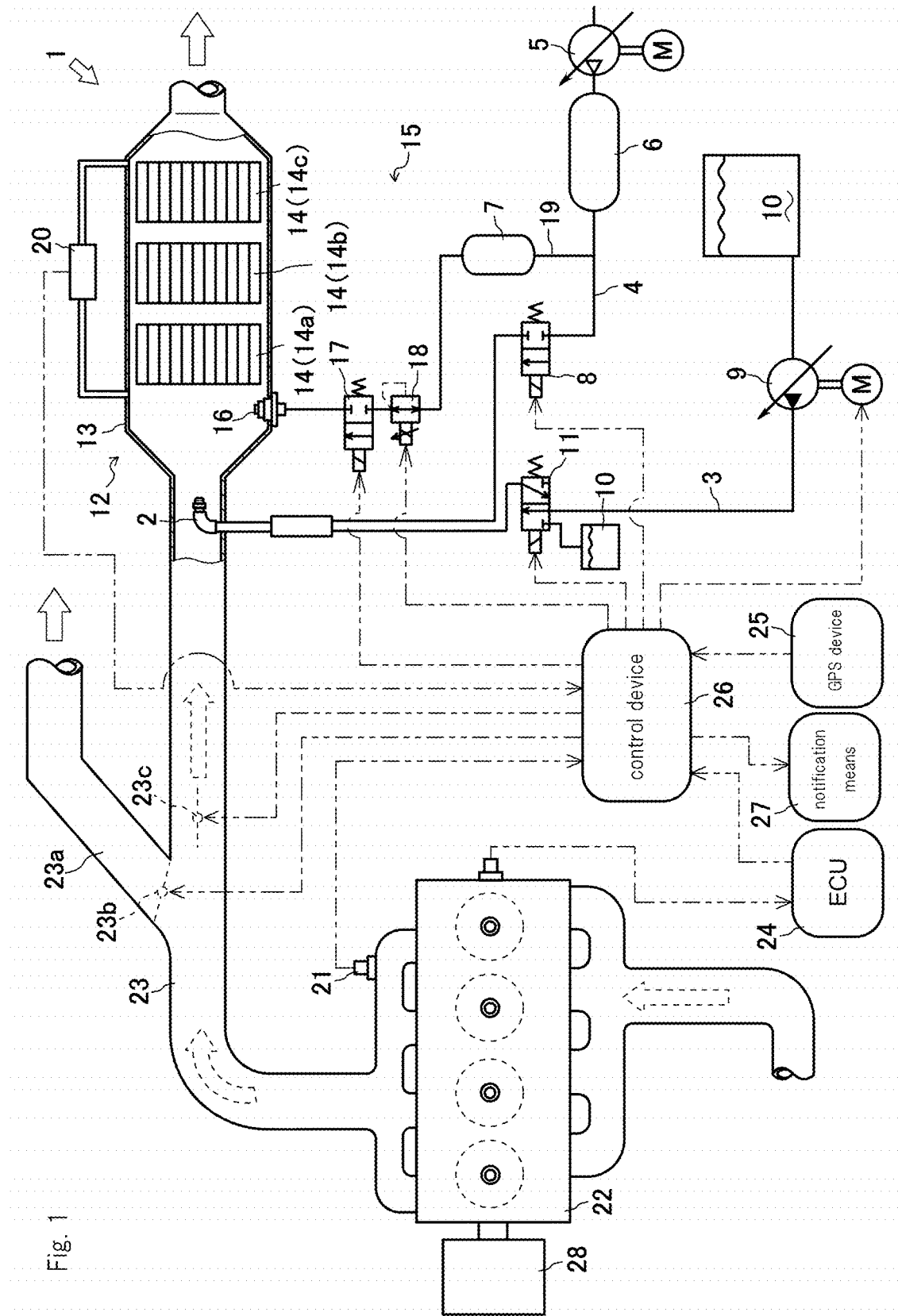
FIG. 1 is a drawing of an entire configuration of an embodiment of an exhaust purifier according to the present invention.

As shown in FIG. 1, the exhaust purifier 1 purifies exhaust gas discharged from an engine 22 which is an internal combustion engine driving a generator 28. The exhaust purifier 1 is provided in an exhaust pipe 23 of the engine 22. The exhaust purifier 1 has a urea water injection nozzle 2, a urea supply passage 3, a first air supply passage 4, a pressurized air supply pump 5 (compressor), an air tank 6, a urea air valve 8, a urea water supply pump 9, a switching valve 11, a catalyst reactor 12, a soot blower 15, a pressure difference sensor 20, an exhaust gas temperature sensor 21, a control device 26, a notification means 27 and the like. The exhaust purifier 1 may alternatively purify exhaust gas discharged from a main engine 105 and an auxiliary engine 106 provided in a ship 100 (see FIG. 14).

The urea water injection nozzle 2 supplies urea water to an inside of the exhaust pipe 23. The urea water injection nozzle 2 is configured by a pipe member, and one of ends (downstream side) thereof is inserted from an outside to an inside of the catalyst reactor 12 or the exhaust pipe 23. The urea water injection nozzle 2 is arranged upstream a first NOx catalyst 14a of the catalyst reactor 12 discussed later. The urea water injection nozzle 2 is connected to the urea supply passage 3 which is a passage of urea water. The urea water injection nozzle 2 is connected to the first air supply passage 4 which is a passage of pressurized air.

The pressurized air supply pump 5 supplies pressurized air. The pressurized air supply pump 5 pressurizes (compresses) air and supply it. The pressurized air supply pump 5 supplies air to the air tank 6 (reservoir tank 7) when a pressure of the air tank 6 (reservoir tank 7) is less than a predetermined pressure, and stops when the pressure of the air tank 6 (reservoir tank 7) reaches the predetermined pressure. In this embodiment, the pressurized air supply pump 5 is not limited and may be any member which can maintain the pressure of the air tank 6 (reservoir tank 7).

The urea air valve 8 opens and closes the passage of pressurized air. The urea air valve 8 is provided in the first air supply passage 4. The urea air valve 8 is configured by an electromagnetic valve, and can open and close the first air supply passage 4 by sliding a spool (not shown). Namely, when the urea air valve 8 opens the first air supply passage 4, pressurized air is supplied to the urea water injection nozzle 2. The urea air valve 8 is not limited to this embodiment, and may be any member which opens and closes the passage of pressurized air.

The urea water supply pump 9 supplies urea water. The urea water supply pump 9 is provided in the urea supply passage 3. The urea water supply pump 9 supplies urea water in a urea water tank 10 via the urea supply passage 3 to the urea water injection nozzle 2 at a predetermined flow rate. The urea water supply pump 9 is not limited to this embodiment, and may be any member which supplies urea water.

The switching valve 11 switches the passage of urea water. The switching valve 11 is provided downstream the urea water supply pump 9 in the urea supply passage 3. The switching valve 11 is configured by an electromagnetic valve, and can open and close the urea supply passage 3 by sliding a spool (not shown). Namely, when the switching valve 11 opens the urea supply passage 3, urea water is supplied to the urea water injection nozzle 2. The switching valve 11 is not limited to this embodiment, and may be any member which opens and closes the passage of urea water.

The catalyst reactor 12 reduces selectively NOx ion exhaust gas by a NOx catalyst arranged therein. The catalyst reactor 12 has a housing 13 and the NOx catalyst 14.

Figure 2:
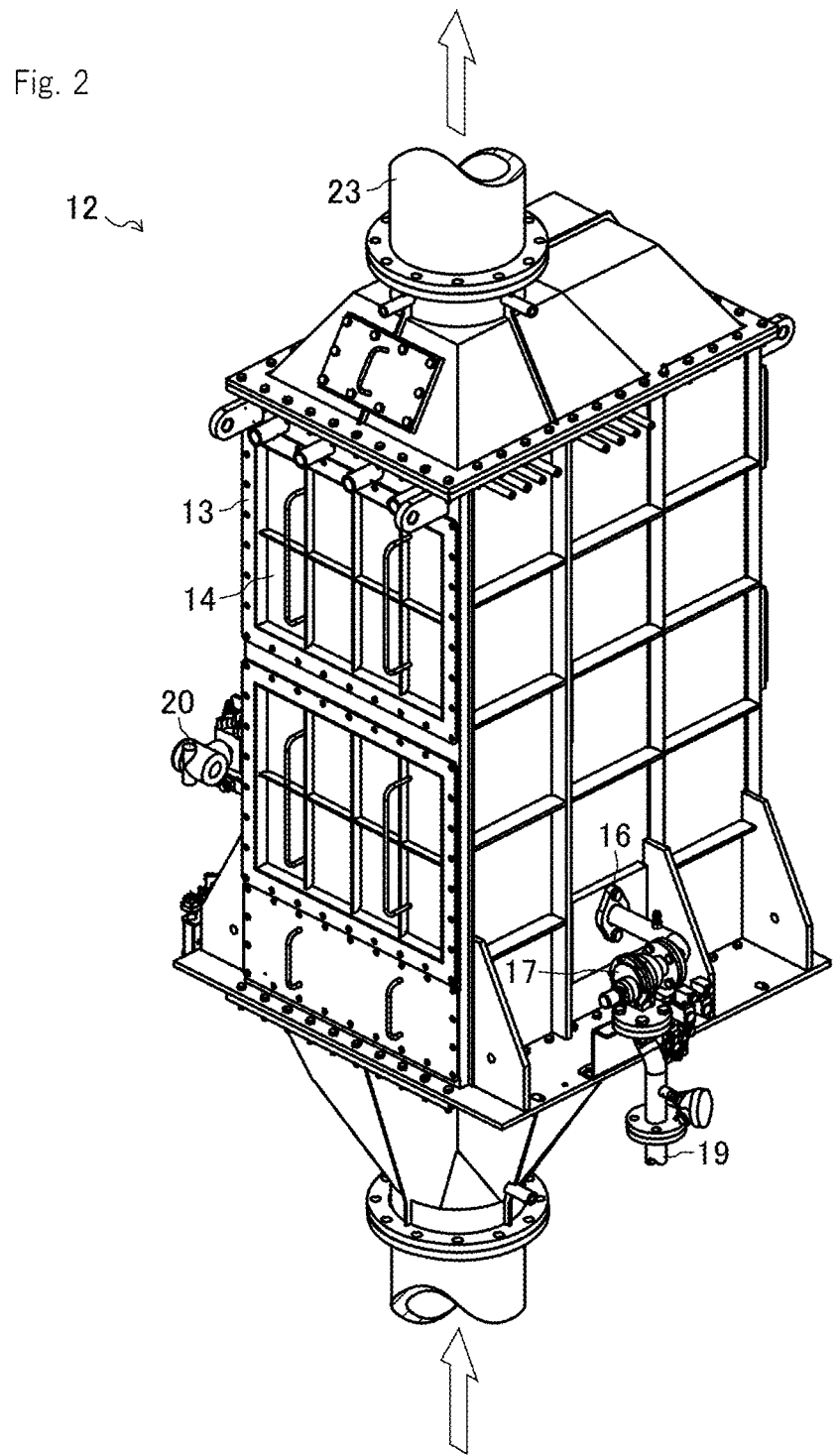
FIG. 2 is a drawing of a catalyst reactor of the embodiment of the exhaust purifier according to the present invention.

As shown in FIGS. 1 and 2, one of ends of the housing 13 is connected to the exhaust pipe 23 connected to the engine 22. The other end of the housing 13 is connected to the exhaust pipe 23 opened to the outside. Namely, the housing 13 is configured as an exhaust passage through which exhaust gas from the engine 22 flows from the one side to the other end. Inside the housing 13, the NOx catalyst 14 is arranged. Concerning the NOx catalyst 14, the first NOx catalyst 14a, a second NOx catalyst 14b and a third NOx catalyst 14c are arranged in order from the one side of the housing 13 (the upstream side of exhaust gas) at predetermined intervals. The first NOx catalyst 14a, the second NOx catalyst 14b and the third NOx catalyst 14c can be sealed within the housing 13 and are detachable. The number of the NOx catalyst 14 arranged inside the housing 13 is not limited to this embodiment.

For example, the NOx catalyst 14 is formed by a material including metal such as alumina, zirconia, vanadia/titania and zeolite. The NOx catalyst 14 is configured by a substantially rectangular parallelepiped having a honeycomb structure in which many through holes are formed. The NOx catalyst 14 is arranged inside the housing 13 of the catalyst reactor 12 so that an axial direction of the through holes is in agreement with a flow direction of exhaust gas. Accordingly, the catalyst reactor 12 is configured so that exhaust gas supplied from the one side of the housing 13 passes through the through holes of the NOx catalyst 14 in the order of the first NOx catalyst 14a, the second NOx catalyst 14b and the third NOx catalyst 14c and then discharged via the other side of the housing 13.

Figure 3:
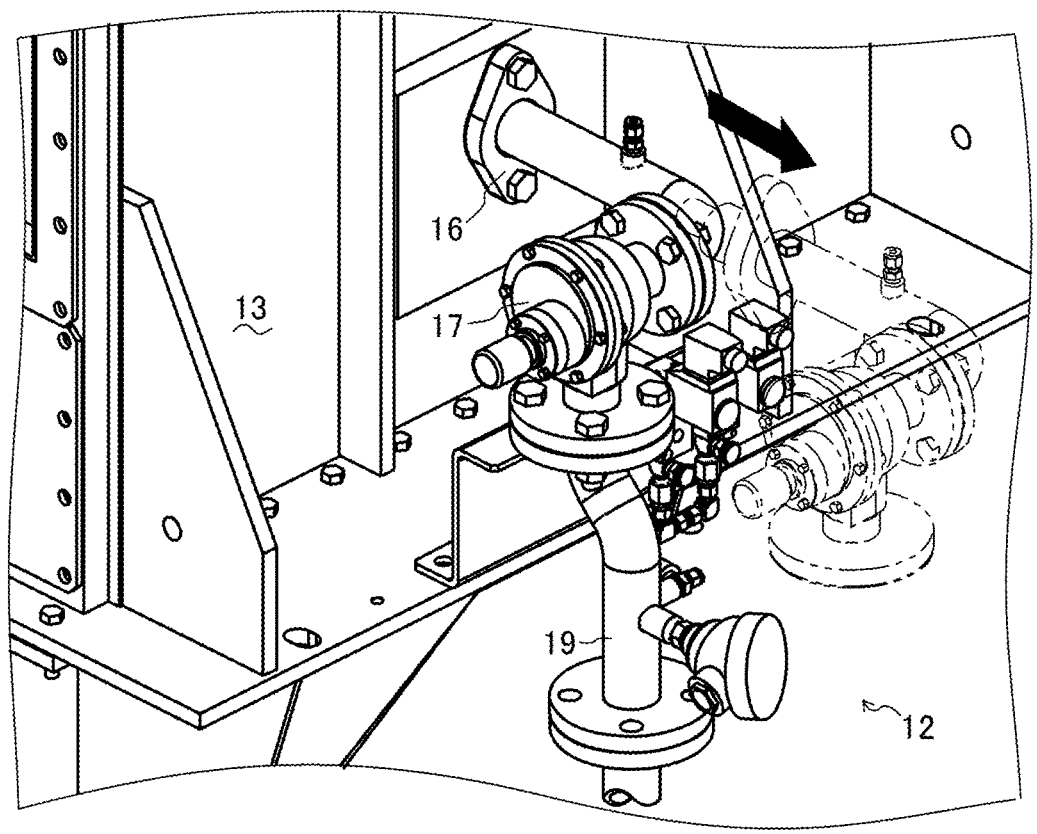
FIG. 3 is an enlargement of an air injection nozzle provided in the catalyst reactor of the embodiment of the exhaust purifier according to the present invention.

As shown in FIGS. 1 to 3, the soot blower 15 removes dust adhering to the NOx catalyst by pressurized air. The soot blower 15 has an air injection nozzle 16, an injection valve 17, a pressure control valve 18 and a second air supply passage 19.

The air injection nozzle 16 injects pressurized air. The air injection nozzle 16 is configured by a nondirectional nozzle. The air injection nozzle 16 is attached to a wall surface of the housing 13 so as to insert an injection port into the housing 13 in an optional position of the housing 13 of the catalyst reactor 12. In this case, the air injection nozzle 16 is arranged near the wall surface of the housing 13 while the injection port is directed to an optional direction in the housing 13. Namely, the injection port of the air injection nozzle 16 should be arranged inside the housing 13 of the catalyst reactor 12. Accordingly, as shown in FIG. 3, for detaching the air injection nozzle 16 from the housing 13, a large space is not required in a direction separating from the housing 13 (see a thick black arrow in FIG. 3). The air injection nozzle 16 is connected to the reservoir tank 7 via the second air supply passage 19 which is a passage of pressurized air. The reservoir tank 7 is connected to the air tank 6 arranged at a separated position.

The injection valve 17 opens and closes the passage of pressurized air. The injection valve 17 is configured by an electromagnetic valve by pilot air. The injection valve 17 is provided in the second air supply passage 19 connected to the air injection nozzle 16. The injection valve 17 can switches whether pressurized air is supplied from the reservoir tank 7 to the air injection nozzle 16 or not. Concretely, the injection valve 17 can open and close the second air supply passage 19 by sliding a spool (not shown). When the injection valve 17 opens the second air supply passage 19, pressurized air is supplied to the air injection nozzle 16. The injection valve 17 is not limited to this embodiment, and may be any member which opens and closes the passage of pressurized air.

The pressure control valve 18 changes pressure of pressurized air. The pressure control valve 18 is provided in the second air supply passage 19 and upstream the injection valve 17. The pressure control valve 18 is configured by an electromagnetic proportional valve and can change pressure of pressurized air. Accordingly, concerning the soot blower 15, pressure of pressurized air is changed by the pressure control valve 18 corresponding to supply pressure and states of the NOx catalyst 14. The pressure control valve 18 is not limited to this embodiment, and may be any member which changes pressure of pressurized air. In addition to the pressure control valve 18, a flow rate may be changed by changing a sectional area of the second air supply passage 19 by a chipped circular partition plate or the like.

The second air supply passage 19 supplies pressurized air. The second air supply passage 19 connects the reservoir tank 7 to the air injection nozzle 16. As shown in FIGS. 2 and 3, an end of the second air supply passage 19 to which an air injection nozzle is connected is bent so as to be along the wall surface of the housing 13 of the catalyst reactor 12. Namely, the second air supply passage 19 is arranged toward a side surface of the housing 13 different from the side surface thereof in which the air injection nozzle 16 is arranged. Accordingly, in the exhaust purifier 1, it is not necessary to secure a space for maintenance of the air injection nozzle 16 in a direction in which the air injection nozzle 16 of the catalyst reactor 12 is provided (see the thick black arrow in FIG. 3).

As shown in FIG. 1, the pressure difference sensor 20 detects a pressure difference ΔP between an upstream exhaust pressure and a downstream exhaust pressure of the catalyst reactor 12. The pressure difference sensor 20 is configured by an upstream pressure sensor and a downstream pressure sensor. The upstream pressure sensor is arranged upstream the catalyst reactor 12, and the downstream pressure sensor is arranged downstream the catalyst reactor 12. Namely, the pressure difference sensor 20 detects the pressure difference ΔP between an exhaust pressure upstream the first NOx catalyst 14a and an exhaust pressure downstream the third NOx catalyst 14c. According to the configuration, existence and degree of closing of the through holes of the NOx catalyst 14 can be detected from a value of the pressure difference ΔP.

The exhaust gas temperature sensor 21 detects an exhaust temperature T. The exhaust gas temperature sensor 21 is arranged in a middle part of the exhaust pipe 23 and near an exhaust manifold. According to the configuration, the exhaust temperature T just after combustion in the engine 22 can be detected.

The exhaust pipe 23 discharges exhaust gas from the engine 22 to the outside (atmosphere). In the exhaust pipe 23, the urea water injection nozzle 2 and the catalyst reactor 12 of the exhaust purifier 1 are provided. In the exhaust pipe 23, a branch pipe 23a, and a first valve 23b and a second valve 23c switching passages of exhaust gas are provided upstream the urea water injection nozzle 2. Namely, in the exhaust pipe 23, the first valve 23b, the second valve 23c and the urea water injection nozzle 2 are arranged in this order from the upstream side. The branch pipe 23a is connected to the exhaust pipe 23. The first valve 23b is arranged inside the branch pipe 23a. The second valve 23c is arranged inside the exhaust pipe 23, upstream the urea water injection nozzle 2 and downstream the branch pipe 23a.

The first valve 23b and the second valve 23c can be opened and closed interlockingly to each other. Concretely, the first valve 23b and the second valve 23c are configured so that the first valve 23b is closed when the second valve 23c is opened, and the first valve 23b is opened when the second valve 23c is closed. Accordingly, when the second valve 23c is opened and the first valve 23b is closed, in the exhaust pipe 23, a passage supplying exhaust gas to the exhaust purifier 1 is configured (the state of FIG. 1). On the other hand, when the second valve 23c is closed and the first valve 23b is opened, in the exhaust pipe 23, a passage that exhaust gas is not purified by the exhaust purifier 1 and is discharged via the branch pipe 23a to the outside (atmosphere) is configured. In the exhaust pipe 23, the urea water injection nozzle 2, the first valve 23b and the second valve 23c may alternatively be arranged in this order from the upstream side. In this case, when urea water is injected, the first valve 23b is controlled to be closed.

As another embodiment, the switching valve 11 which closes selectively one of the exhaust pipe 23 and the branch pipe 23a may alternatively be provided in a connection part of the branch pipe 23a. When the branch pipe 23a is closed, the exhaust pipe 23 configures a passage through which exhaust gas is supplied to the exhaust purifier 1. On the other hand, when the exhaust pipe 23 is closed, the exhaust pipe 23 configures a passage that exhaust gas is not purified by the exhaust purifier 1 and is discharged via the branch pipe 23a to the outside (atmosphere).

An ECU 24 controls the engine 22. The ECU 24 may be configured by connecting a CPU, a ROM, a RAM, a HDD and the like with a bus, or may alternatively be a one-chip LSI or the like. The ECU 24 can obtain information concerning an engine rotation speed N and a fuel injection amount F.

The control device 26 controls the urea air valve 8, the urea water supply pump 9, the switching valve 11, the injection valve 17, the pressure control valve 18, the first valve 23b, the second valve 23c and the like. In the control device 26, various programs and data for controlling the urea air valve 8, the urea water supply pump 9, the switching valve 11, the injection valve 17, the pressure control valve 18, the first valve 23b, the second valve 23c and the like, a restriction area map M1 for calculating a restriction area of exhaust gas, an exhaust gas flow rate map M2 for calculating an exhaust gas flow rate based on the engine rotation speed N, the fuel injection amount F and the exhaust temperature T, an initial pressure difference map M3 for calculating an initial pressure difference $\Delta Pi$ which is a pressure difference of the catalyst reactor 12 in the initial state at every exhaust gas flow rate, a reference pressure difference rising amount map M4 for calculating a first reference pressure difference rising amount $\Delta Pt1$ at which the catalyst must be exchanged because of temporal change and the like and a second reference pressure difference rising amount $\Delta Pt2$ which is a condition different from that of the soot blow at a normal predetermined condition and at which the soot blow with higher washing effect is required at every initial pressure difference $\Delta Pi$, and the like are stored. The control device 26 may be configured by connecting a CPU, a ROM, a RAM, a HDD and the like with a bus, or may alternatively be a one-chip LSI or the like. The control device 26 may be configured integrally with the ECU 24 controlling the engine 22.

Figure 4:
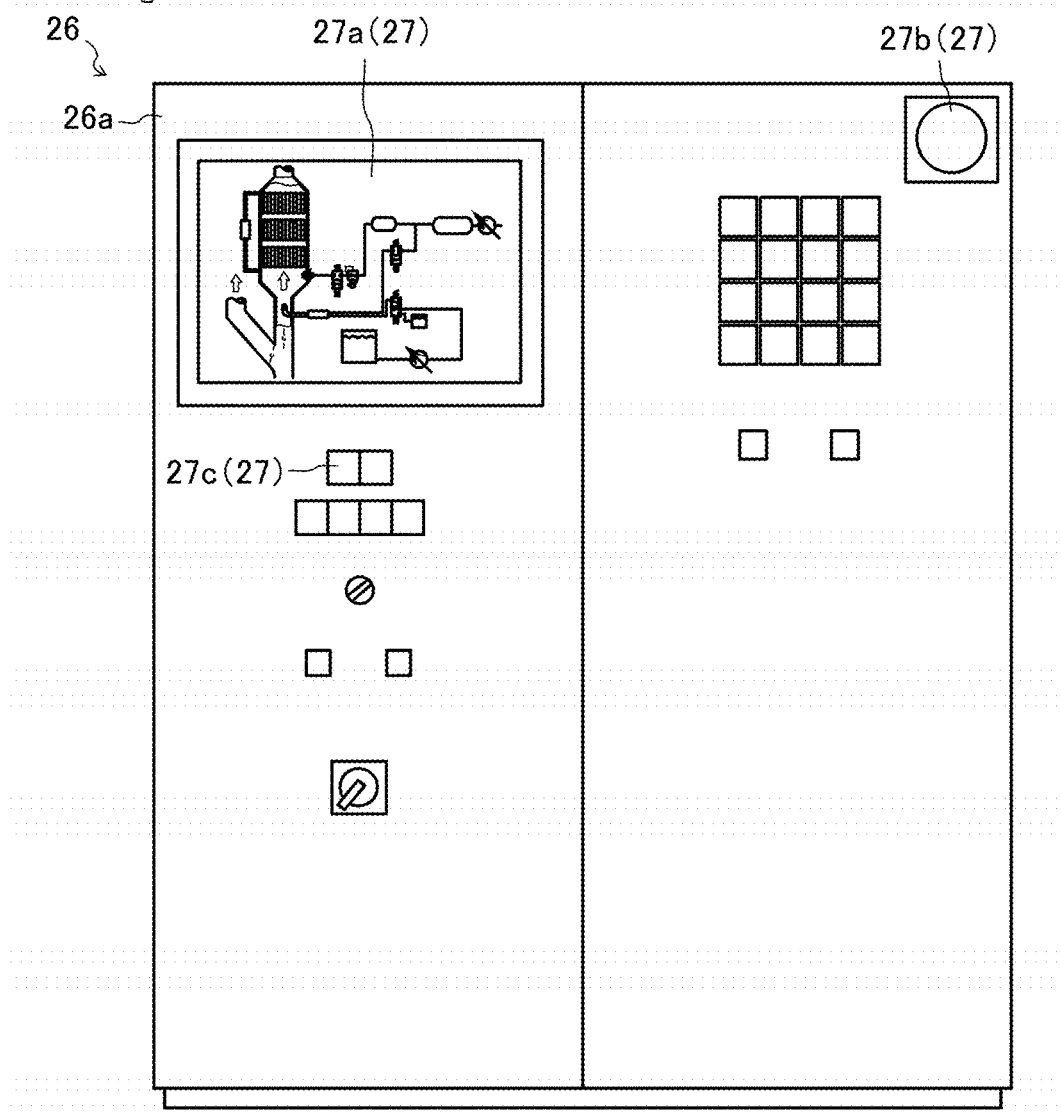
FIG. 4 is a schematic drawing of a notification means of the embodiment of the exhaust purifier according to the present invention.

As shown in FIG. 4, the notification means 27 notifies a state of the exhaust purifier 1 to an operator. The notification means 27 is provided in a control panel 26a in which the control device 26 is housed. The notification means 27 is configured by a display screen 27a showing the state of the exhaust purifier 1, a speaker 27b emitting alarm sound, a switch 27c stopping emission of an alarm, and the like.

The control device 26 is connected to a solenoid of the urea air valve 8 and can control opening and closing of the urea air valve 8.

The control device 26 is connected to a driving motor of the urea water supply pump 9 and can control a driving state of the urea water supply pump 9. Namely, by controlling the driving state of the urea water supply pump 9, the control device 26 can change optionally an amount of urea water added to exhaust gas.

The control device 26 is connected to the switching valve 11 and can control opening and closing of the switching valve 11.

The control device 26 is connected to the injection valve 17 and can control opening and closing of the injection valve 17.

The control device 26 is connected to the pressure control valve 18 and can control opening and closing of the pressure control valve 18.

The control device 26 is connected to the pressure difference sensor 20 and can obtain a signal concerning the pressure difference $\Delta P$ between the upstream exhaust pressure and the downstream exhaust pressure of the catalyst reactor 12 detected by the pressure difference sensor 20.

The control device 26 is connected to the first valve 23b and the second valve 23c and can control opening and closing of the first valve 23b and the second valve 23c.

The control device 26 is connected to the ECU 24 and can obtain the engine rotation speed N, the fuel injection amount F and various information concerning the engine 22 detected by the ECU 24. The control device 26 may obtain the information concerning the engine 22 directly without the ECU 24.

The control device 26 is connected to a GPS (global positioning system) device 25 and can obtain a position detected by the GPS device 25. The control device 26 is connected to an input device (not shown) and can obtain a signal concerning a target purification rate and a concentration of urea water inputted via the input device. Otherwise, information concerning the target purification rate and the concentration of urea water may be inputted previously.

The control device 26 is connected to the notification means 27, and can notify the state of the exhaust purifier 1 and emit an alarm showing abnormal degradation of the NOx catalyst 14.

For example, when the exhaust purifier 1 configured as the above is mounted on a ship, the control device 26 obtains an actual position of the ship detected by the GPS device 25 and judges whether the actual position is within the restriction area (restriction sea area) of exhaust gas or not with the restriction area map M1. When the actual position is judged to be within the restriction area of exhaust gas, the control device 26 opens the second valve 23c and closes the first valve 23b. Namely, exhaust gas is purified by the exhaust purifier 1 and then discharged to the outside. When the actual position is judged not to be within the restriction area of exhaust gas, the control device 26 closes the second valve 23c and opens the first valve 23b. Namely, exhaust gas is not purified by the exhaust purifier 1 and discharged to the outside via the branch pipe 23a. It may alternatively be configured that the control device 26 receives an opening and closing signal of the first valve 23b and the second valve 23c by manual operation and controls the first valve 23b and the second valve 23c corresponding to the opening and closing signal.

Figure 5:
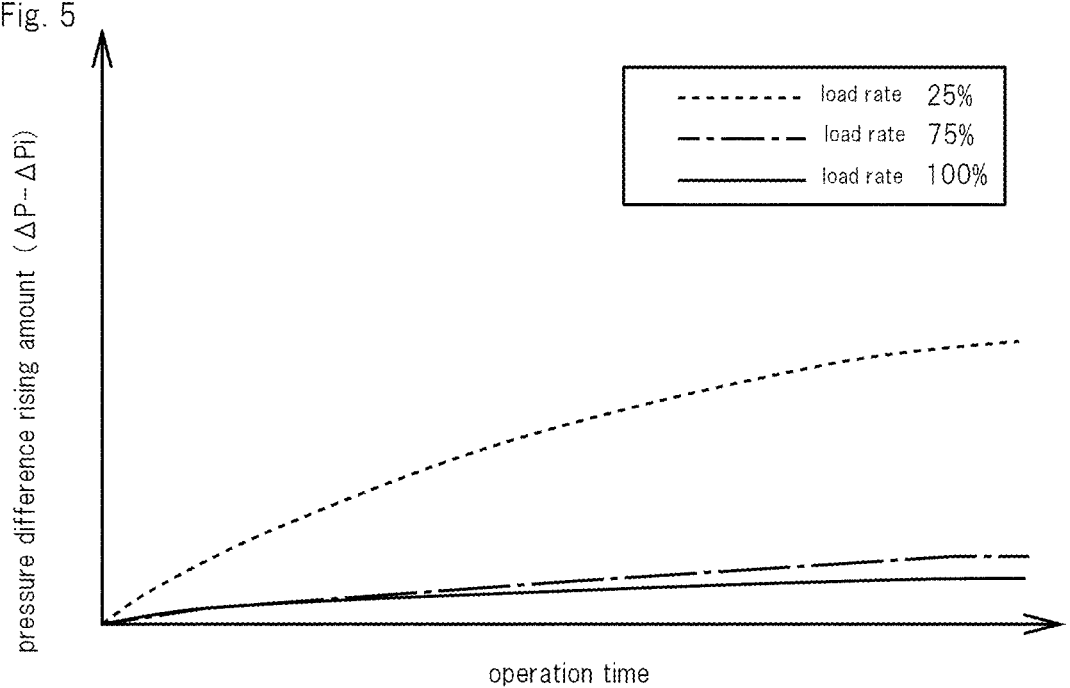
FIG. 5 is a graph showing temporal change of a pressure difference for every load rate of the exhaust purifier according to the present invention.
Figure 6:
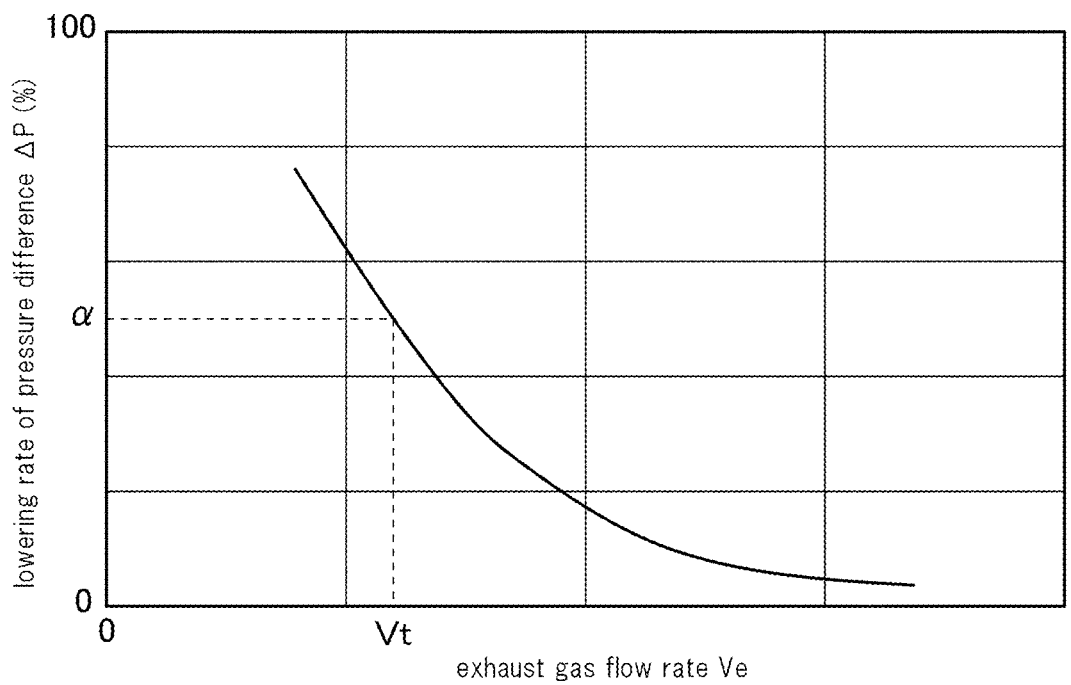
FIG. 6 is a graph showing a relation between an exhaust gas flow rate and a lowering rate of the pressure difference of the exhaust purifier according to the present invention

Next, referring to FIGS. 5 and 6, temporal change of the pressure difference $\Delta P$ for every load rate Wr (exhaust gas flow rate Ve) of the engine 22 in the exhaust purifier 1 is explained. FIG. 5 shows temporal change of a pressure difference rising amount ($\Delta P - \Delta Pi$) of the catalyst reactor 12 for every load rate Wr at the predetermined engine rotation speed N.

As shown in FIG. 5, when the engine 22 is operated at the predetermined engine rotation speed N under the load rate of 100% or 75%, the pressure difference rising amount ($\Delta P - \Delta Pi$) of the catalyst reactor 12 is increased gradually following progress of operation time. On the other hand, when the engine 22 is operated at the predetermined engine rotation speed N under the load rate of 25%, the pressure difference rising amount ($\Delta P - \Delta Pi$) of the catalyst reactor 12 is increased more suddenly than that of the case of the load rate of 100% or 75%. Herein, the pressure difference $\Delta P$ of the catalyst reactor 12 is raised when dust adheres to the NOx catalyst 14 and the NOx catalyst 14 is clogged. Namely, as low as the load rate Wr of the engine 22 is, as often as dust adheres to the NOx catalyst 14. That is because the exhaust gas flow rate Ve is lowered when the load rate Wr of the engine 22 is low so that an amount of dust removed from the NOx catalyst 14 by power of exhaust gas is reduced. Accordingly, as shown in FIG. 6, in the exhaust purifier 1, as low as the exhaust gas flow rate Ve is (as low as the load rate Wr is), as large as the lowering rate of the pressure difference ΔP of the catalyst reactor 12 caused by removal of dust from the NOx catalyst 14 by the soot blow is. Accordingly, in the exhaust purifier 1, by performing the soot blow at the exhaust gas flow rate Ve which is not more than a reference exhaust gas flow rate Vt at which the lowering rate α of the pressure difference ΔP of the pressure difference ΔP of the catalyst reactor 12 by the soot blow, dust can be removed efficiently.

Figure 7:
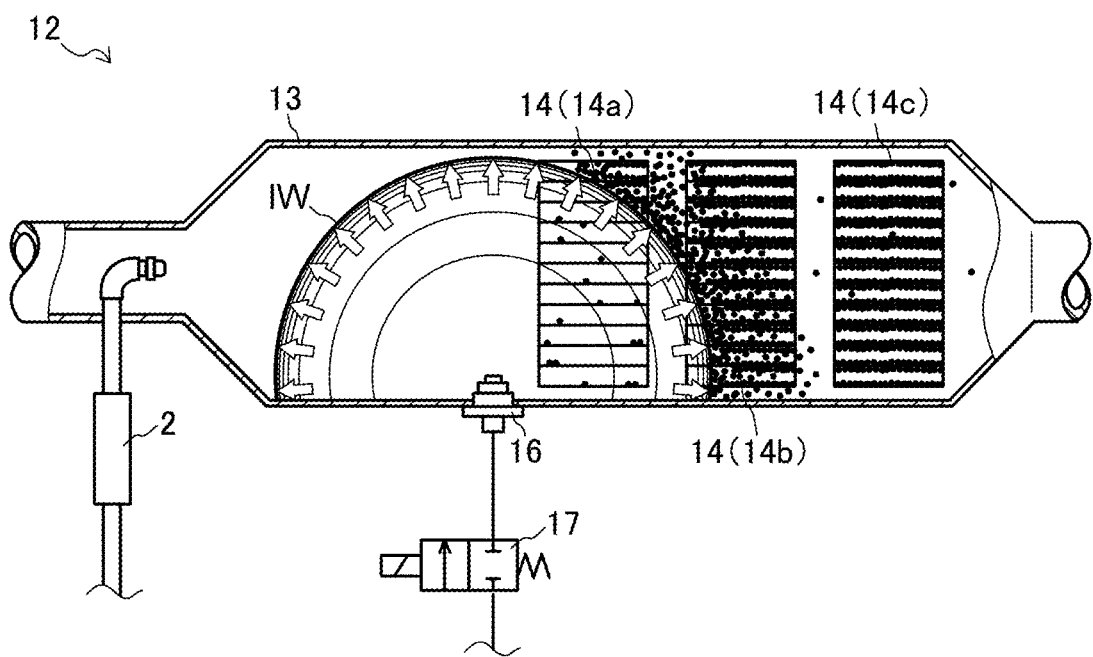
FIG. 7 is a conceptual drawing of a mode of soot blow in the catalyst reactor of the embodiment of the exhaust purifier according to the present invention.
Figure 8A:
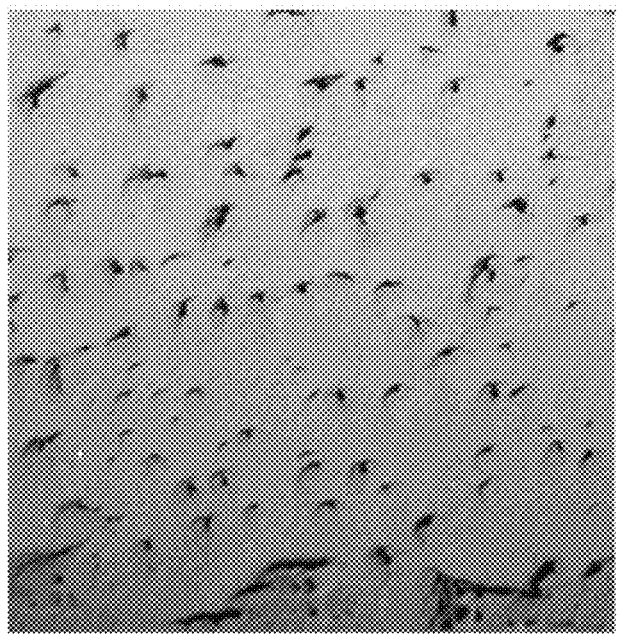
FIG. 8A is a photo showing a state of a NOx catalyst to which dust is adhered of the embodiment in the exhaust purifier according to the present invention.
Figure 8B:
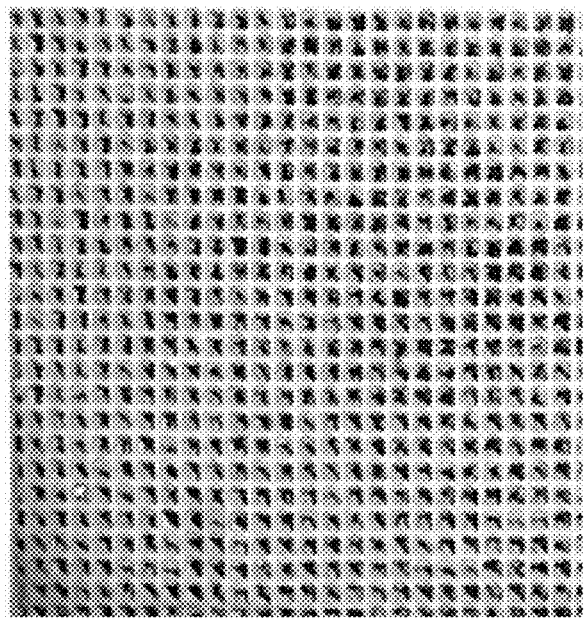
FIG. 8B is a photo showing a state of the NOx catalyst after the soot blow in the exhaust purifier according to the present invention.
Figure 9:
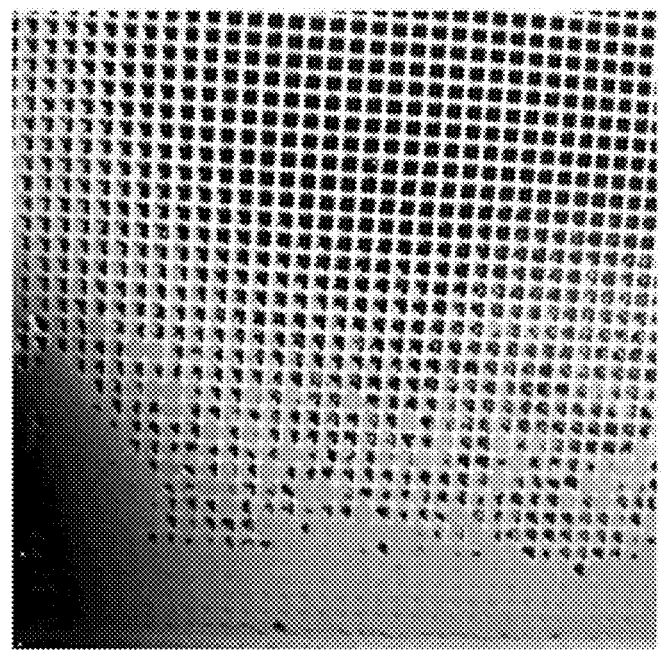
FIG. 9 is a photo showing a state of a NOx catalyst after the soot blow in an exhaust purifier having a conventional soot blower.

Next, referring to FIGS. 7 to 9, an instantaneous pressurization method which is a method of the soot blow in the exhaust purifier 1 is explained.

In the exhaust purifier 1, pressurized air is supplied into the housing 13 of the catalyst reactor 12 whose internal pressure is a pressure P for a time t by the soot blower 15. In this case, the pressurized air is supplied so that the pressure (P+ΔIP) in the housing 13 after the supply is not less than a predetermined value β as shown by a formula (P+ΔIP)≥β, and a pressure increase rate per unit time ΔIP/t is not less than a predetermined value as shown by a formula ΔIP/t≥γ. Accordingly, in the housing 13, a shock wave IW is generated by sudden pressure rising. As shown in FIG. 7, the shock wave IW spreads spherically from the air injection nozzle 16 of the soot blower 15 via exhaust gas in the housing 13. Since the housing 13 is filled with the exhaust gas, the shock wave IW spreads in all the directions in the housing 13 centering on the air injection nozzle 16 regardless of a direction and a position of the air injection nozzle 16 in the housing 13. Namely, the shock wave IW reaches the whole surface of the NOx catalyst 14 contacting the exhaust gas in the housing 13.

In a conventional exhaust purifier in which dust is removed by applying pressurized air to a NOx catalyst 14, power of the pressurized air acts on only the dust adhering to a part of the NOx catalyst to which the pressurized air is applied. Accordingly, as a NOx catalyst shown in FIG. 9, the power of the pressurized air does not act on the dust adhering to a part of the NOx catalyst which is not included within an injection area of a nozzle, whereby the dust is not removed (a clogged part in FIG. 9). On the other hand, in the exhaust purifier 1 according to the present invention, the power of the shock wave 1W acts equally on the dust adhering to the surface of the NOx catalyst 14 contacting the exhaust gas in the housing 13. Accordingly, the large percentage of the dust adhering to the surface of the NOx catalyst 14 as shown in FIG. 8A is removed uniformly by the power of the shock wave 1W as shown in FIG. 8B.

Figure 10:
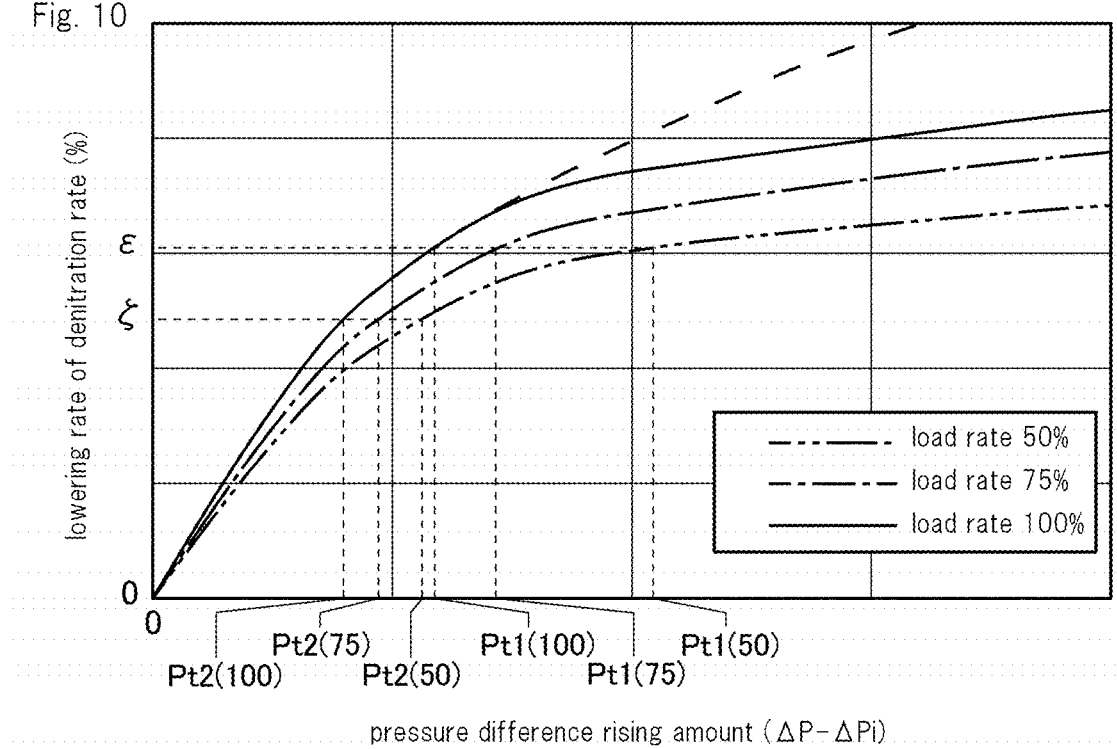
FIG. 10 is a graph showing a relation between a pressure difference rising amount and a lowering rate of a denitration rate of the exhaust purifier according to the present invention.
Figure 11:
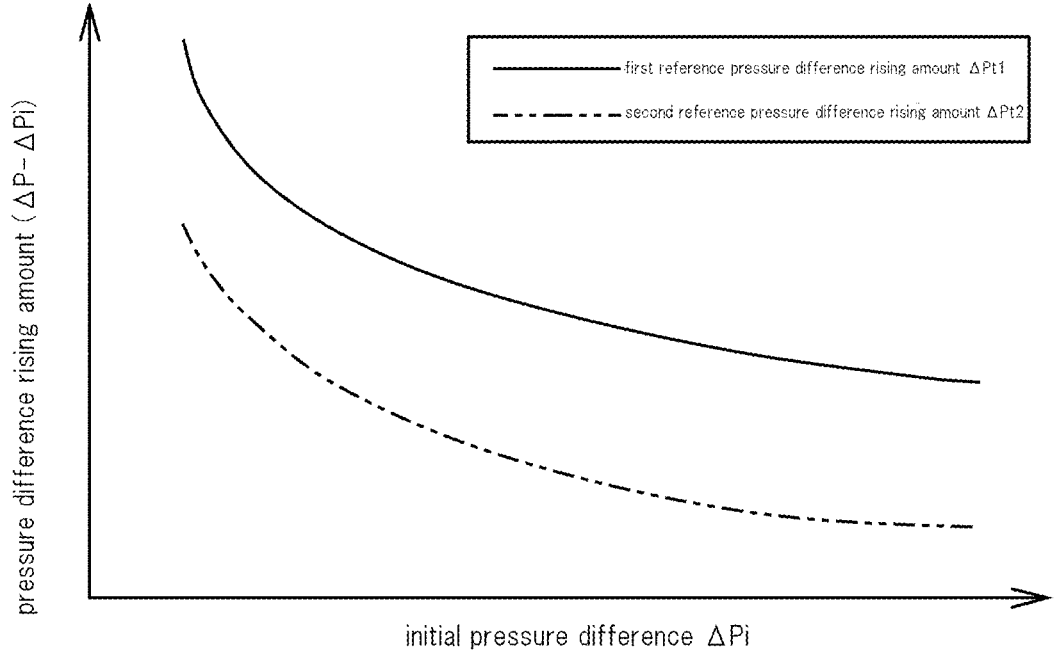
FIG. 11 is a graph showing a reference pressure difference rising amount for every initial pressure difference of the exhaust purifier according to the present invention.

Next, referring to FIGS. 10 and 11, a relation between a rising amount of the pressure difference ΔP of the catalyst reactor 12 for every load rate Wr (exhaust gas flow rate Ve) of the engine 22 and a lowering rate of a denitration rate is explained. FIG. 10 shows a rising amount of the pressure difference ΔP for every load rate Wr at the predetermined engine rotation speed N and the lowering rate of the denitration rate. FIG. 11 is the reference pressure difference rising amount map M4 showing the first reference pressure difference rising amount ΔPt1 and the second reference pressure difference rising amount ΔPt2 for every initial pressure difference ΔPi.

As shown in FIG. 10, in the exhaust purifier 1, NOx catalyst remaining dust is accumulated by long-term operation, and a difference between the initial pressure difference ΔPi of the catalyst reactor 12 and the actual pressure difference ΔP is increased and the denitration rate is lowered regardless of the load rate of the engine 22. Accordingly, in the exhaust purifier 1, the lowering rate of the denitration rate is guessed from the difference between the initial pressure difference ΔPi of the catalyst reactor 12 and the actual pressure difference ΔP at the optional exhaust gas flow rate Ve. Accordingly, in the exhaust purifier 1, in a range not less than the first reference pressure difference rising amount ΔPt1 which is a reference value of the difference between the initial pressure difference ΔPi of the catalyst reactor 12 and the actual pressure difference ΔP at which the lowering rate of the denitration rate is not less than a predetermined value ε for every load rate Wr, lowering of the denitration rate of the NOx catalyst 14 by long-term operation can be suppressed by exchanging the catalyst because of temporal degradation and washing the catalyst manually. Similarly, in the exhaust purifier 1, in a range not less than the second reference pressure difference rising amount ΔPt2 which is a reference value of the difference between the initial pressure difference ΔPi of the catalyst reactor 12 and the actual pressure difference ΔP at which the lowering rate of the denitration rate is not less than a predetermined value ζ for every load rate Wr, lowering of the denitration rate of the NOx catalyst 14 by long-term operation can be suppressed by performing the soot blow with higher washing effect than the normal soot blow. In the exhaust purifier 1, when a NOx density sensor or the like is provided, by comparing the lowering rate of the denitration rate calculated from the pressure difference rising amount and the obtained NOx density for every load rate Wr, abnormal degradation of the NOx catalyst (a part of a middle dashed line in FIG. 10) can be detected.

Accordingly, as shown in FIG. 11, based on the map reference pressure difference rising amount M4 which determines the first reference pressure difference rising amount ΔPt1 at which the catalyst must be exchanged because of temporal change and the like and the second reference pressure difference rising amount ΔPt2 at which the soot blow with higher washing effect than the normal soot blow is required for every initial pressure difference ΔPi, a control mode of the soot blower 15 can be determined from the initial pressure difference ΔPi and the pressure difference rising amount (ΔP−ΔPi).

Below, referring to FIGS. 12 and 13, the control mode of the soot blower 15 in the exhaust purifier 1 which is an embodiment of the exhaust purifier 1 according to the present invention is explained. In this embodiment, the exhaust purifier 1 is mounted on a ship 100 shown in FIG. 14. However, the exhaust purifier 1 is not limited thereto and may alternatively be provided in an engine for a generator arranged ashore.

In the case in which the actual position of the ship 100 on which the exhaust purifier 1 is mounted is within the restriction area of exhaust gas, when a difference between the pressure difference ΔP of the catalyst reactor 12 and the calculated initial pressure difference ΔPi of the catalyst reactor 12 is less than the first reference pressure difference rising amount ΔPt1, the control device 26 starts soot blow control. On the other hand, when the difference between the pressure difference ΔP of the catalyst reactor 12 and the calculated initial pressure difference ΔPi of the catalyst reactor 12 is not less than the first reference pressure difference rising amount ΔPt1, the control device 26 judges as pressure difference abnormality and emits an alarm.

In the soot blow control, when the difference between the pressure difference ΔP of the catalyst reactor 12 and the calculated initial pressure difference ΔPi of the catalyst reactor 12 is less than the second reference pressure difference rising amount ΔPt2 and the calculated exhaust gas flow rate Ve is less than the reference exhaust gas flow rate Vt, the control device 26 performs the soot blow of a standard mode. On the other hand, when the difference between the pressure difference ΔP of the catalyst reactor 12 and the calculated initial pressure difference ΔPi of the catalyst reactor 12 is not less than the second reference pressure difference rising amount ΔPt2, the control device 26 performs the soot blow of a washing mode. When the calculated exhaust gas flow rate Ve is not less than the reference exhaust gas flow rate Vt, the soot blow is not performed.

Herein, a blow pressure of the washing mode (for example, 0.8 MPa) is set higher than a blow pressure of the standard mode (for example, 0.5 MPa). A blow interval of the washing mode (for example, 30 min) is set higher than a blow interval of the standard mode (for example, 15 min). A number of blow of the washing mode (for example, 5) is set higher than a number of blow of the standard mode (for example, 3).

Next, the control mode of the soot blower 15 in the exhaust purifier 1 which is the embodiment of the exhaust purifier 1 according to the present invention is explained concretely. The control device 26 controls the soot blower 15 interlockingly with start and stop of the engine 22.

Figure 12:
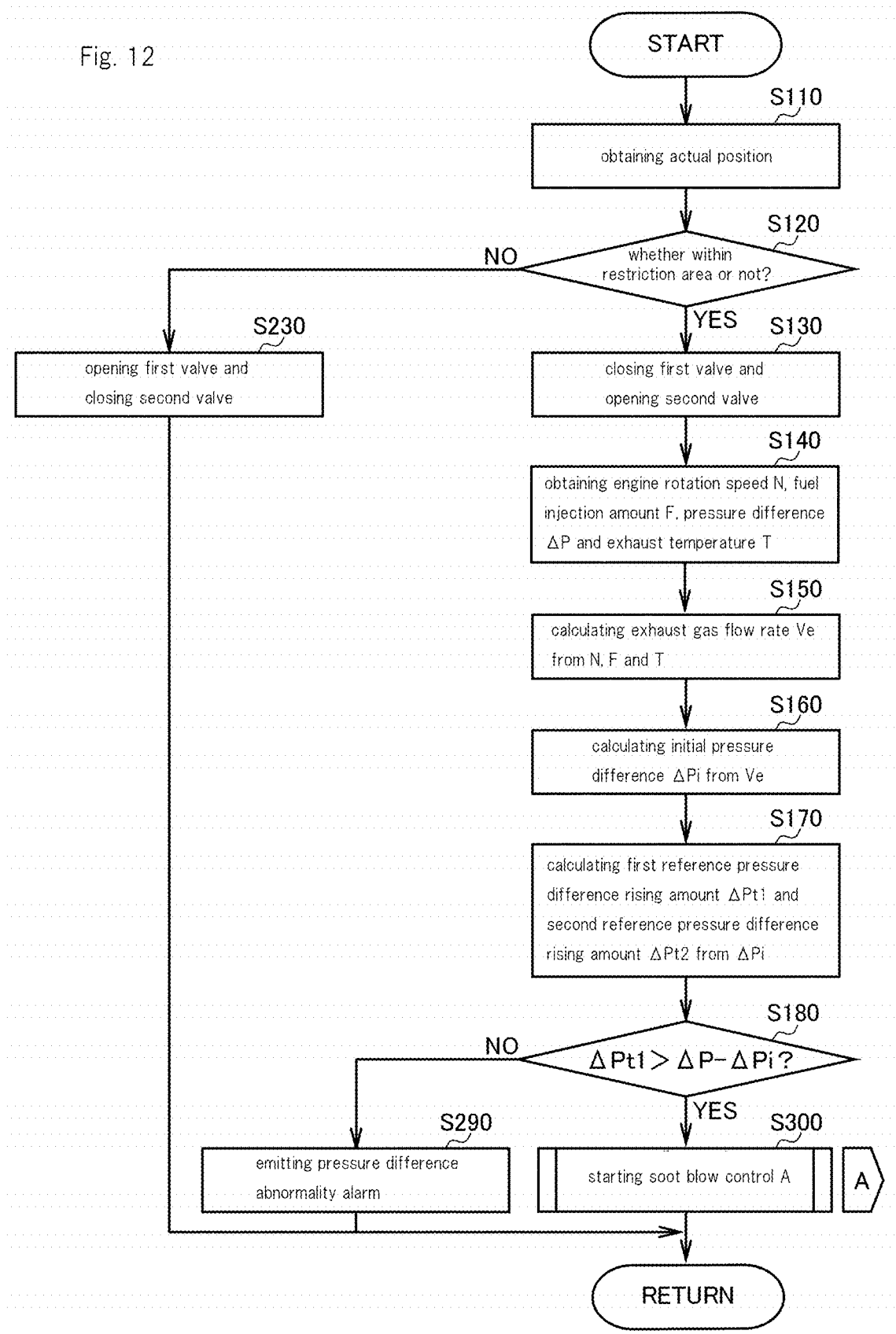
FIG. 12 is a flow chart showing a basic control mode of the soot blow in the catalyst reactor of the embodiment of the exhaust purifier according to the present invention.

As shown in FIG. 12, in a step S110, the control device 26 obtains an actual position of the ship 100 detected by the GPS device 25, and shift to a step S120.

In the step S120, the control device 26 judges whether the obtained actual position of the ship 100 is within the restriction area or not based on the restriction area map M1.

As a result, when the obtained actual position of the ship 100 is judged to be within the restriction area, the control device 26 shift to a step S130.

On the other hand, when the obtained actual position of the ship 100 is judged not to be within the restriction area, the control device 26 shift to a step S230.

In the step S130, the control device 26 closes the first valve 23*b*, opens the second valve 23*c*, and shift to a step S140.

In the step S140, the control device 26 obtains the engine rotation speed N and the fuel injection amount F from the ECU 24, obtains the pressure difference ΔP of the catalyst reactor 12 from the pressure difference sensor 20, obtains the exhaust temperature T from the exhaust gas temperature sensor 21, and shift to a step S150.

In the step S150, the control device 26 calculates the exhaust gas flow rate Ve from the obtained engine rotation speed N, the fuel injection amount F and the exhaust temperature T based on the exhaust gas flow rate map M2, and shift to a step S160.

In the step S160, the control device 26 calculates the calculated initial pressure difference ΔPi of the catalyst reactor 12 at the exhaust gas flow rate Ve from the calculated exhaust gas flow rate Ve based on the initial pressure difference map M3, and shift to a step S170.

In the step S170, the control device 26 calculates the first reference pressure difference rising amount ΔPt1 at which the catalyst must be exchanged because of temporal change and the like and the second reference pressure difference rising amount ΔPt2 at which the soot blow with higher washing effect than the normal soot blow is required from the calculated initial pressure difference ΔPi based on the map reference pressure difference rising amount M4, and shift to a step S180.

In the step S120, the control device 26 judges whether the difference between the obtained pressure difference ΔP of the catalyst reactor 12 and the calculated initial pressure difference ΔPi of the catalyst reactor 12 is less than the calculated first reference pressure difference rising amount ΔPt1 or not.

As a result, when the difference between the obtained pressure difference ΔP of the catalyst reactor 12 and the calculated initial pressure difference ΔPi of the catalyst reactor 12 is judged to be less than the calculated first reference pressure difference rising amount ΔPt1, the control device 26 shift to a step S300.

On the other hand, when the difference between the obtained pressure difference ΔP of the catalyst reactor 12 and the calculated initial pressure difference ΔPi of the catalyst reactor 12 is judged not to be less than the calculated first reference pressure difference rising amount ΔPt1, the control device 26 shift to a step S290.

Figure 13:
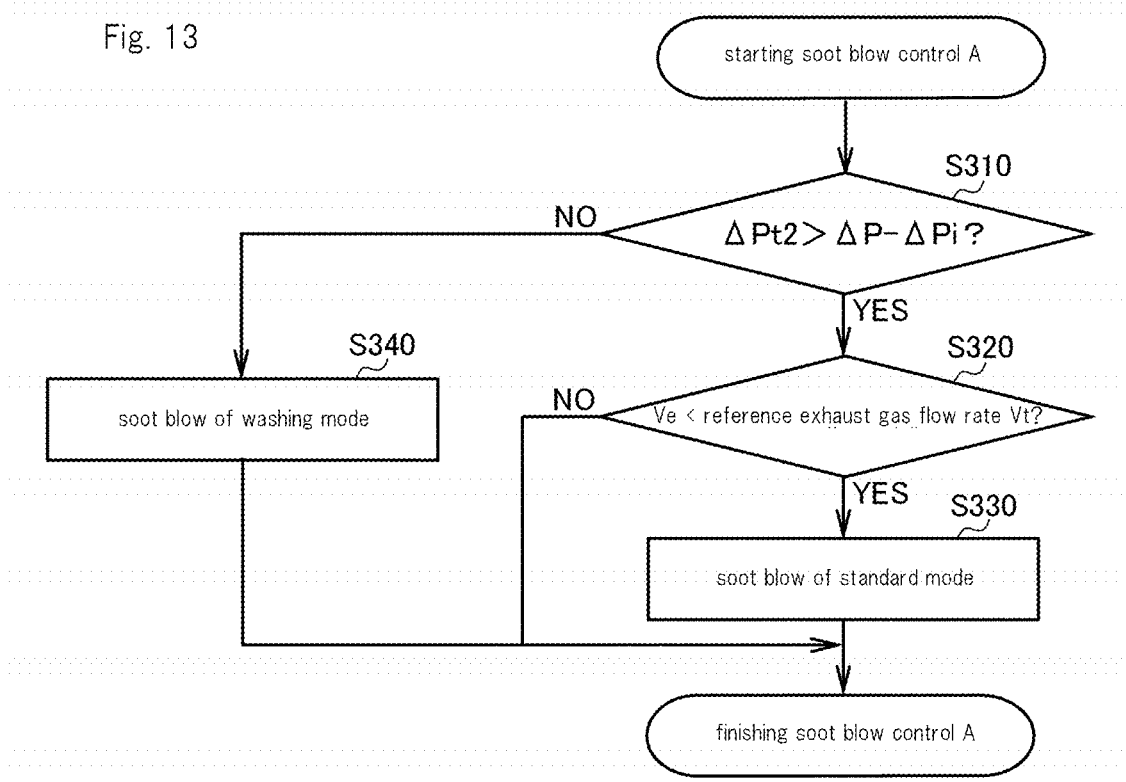
FIG. 13 is a flow chart showing a control mode of soot blow control in the catalyst reactor of the embodiment of the exhaust purifier according to the present invention.

In the step S300, the control device 26 starts soot blow control A and shift to a step S310 (see FIG. 13).

In the step S230, the control device 26 opens the first valve 23*b*, closes the second valve 23*c*, and shift to the step S110.

In the step S290, the control device 26 emits a pressure difference abnormality alarm by the notification means 27, and shift to the step S110.

As shown in FIG. 13, in the step S310, the control device 26 judges whether the difference between the obtained pressure difference ΔP of the catalyst reactor 12 and the calculated initial pressure difference ΔPi of the catalyst reactor 12 is less than the calculated second reference pressure difference rising amount ΔPt2 or not.

As a result, when the difference between the obtained pressure difference ΔP of the catalyst reactor 12 and the calculated initial pressure difference ΔPi of the catalyst reactor 12 is judged to be less than the calculated second reference pressure difference rising amount ΔPt2, the control device 26 shift to a step S320.

On the other hand, when the difference between the obtained pressure difference ΔP of the catalyst reactor 12 and the calculated initial pressure difference ΔPi of the catalyst reactor 12 is judged not to be less than the calculated second reference pressure difference rising amount ΔPt2, the control device 26 shift to a step S340.

In the step S320, the control device 26 judges whether the calculated exhaust gas flow rate Ve is less than the reference exhaust gas flow rate Vt or not.

As a result, when the calculated exhaust gas flow rate Ve is judged to be less than the reference exhaust gas flow rate Vt, the control device 26 shift to a step S330.

On the other hand, when the calculated exhaust gas flow rate Ve is judged not to be less than the reference exhaust gas flow rate Vt, the control device 26 shift to the step S110 (see FIG. 12).

In the step S330, the control device 26 performs the soot blow of the standard mode which is the normal soot blow, finishes soot blow control A, and shift to the step S110 (see FIG. 12).

In the step S340, the control device 26 performs the soot blow of the washing mode which is a condition different from that of the soot blow at the normal predetermined condition and at which the soot blow has higher washing effect, finishes soot blow control A, and shift to the step S110 (see FIG. 12).

According to the configuration, in the exhaust purifier 1, the soot blow is performed with the mode in which dust can be removed efficiently based on an operation state of the engine 22. Accordingly, in the exhaust purifier 1, both improve of a removal rate of dust by the soot blow and suppression of an amount of compressed air used for the soot blow can be realized.

In the exhaust purifier 1, by transmitting the shock wave 1W using compressed air via exhaust gas, power of the shock wave 1W acts on the whole area of the surface of the NOx catalyst 14 contacting the exhaust gas. Namely, by change of pressure in the catalyst reactor 12, the dust is removed equally from the NOx catalyst 14. Accordingly, in the exhaust purifier 1, a purification rate (denitration rate) of the NOx catalyst 14 and the pressure difference ΔP can be recovered to the initial state.

In the exhaust purifier 1, accumulation of remaining dust on the NOx catalyst 14 by temporal change is guessed by increase of the pressure difference ΔP of the catalyst reactor 12. Accordingly, in the exhaust purifier 1, lowering of the purification rate (denitration rate) of the NOx catalyst 14 by the temporal change can be suppressed by performing the soot blow different from the normal soot blow.

In the exhaust purifier 1, abnormality of the NOx catalyst 14 is judged based on the pressure difference rising amount (ΔP−ΔPi) and notified to an operator so as to perform suitable treatment. Furthermore, the exhaust purifier 1 may be configured that when the NOx density sensor is provided, the lowering amount of the purification rate (denitration rate) is calculated from the pressure difference rising amount of the NOx catalyst 14 and the fuel injection amount F and fuel injection timing of the engine 22 is changed so as to reduce a NOx discharge amount so as to reduce load of the NOx catalyst 14. Accordingly, in the exhaust purifier 1, temporal lowering of the denitration rate of the NOx catalyst 14 caused by accumulation of dust can be compensated.

Figure 14:
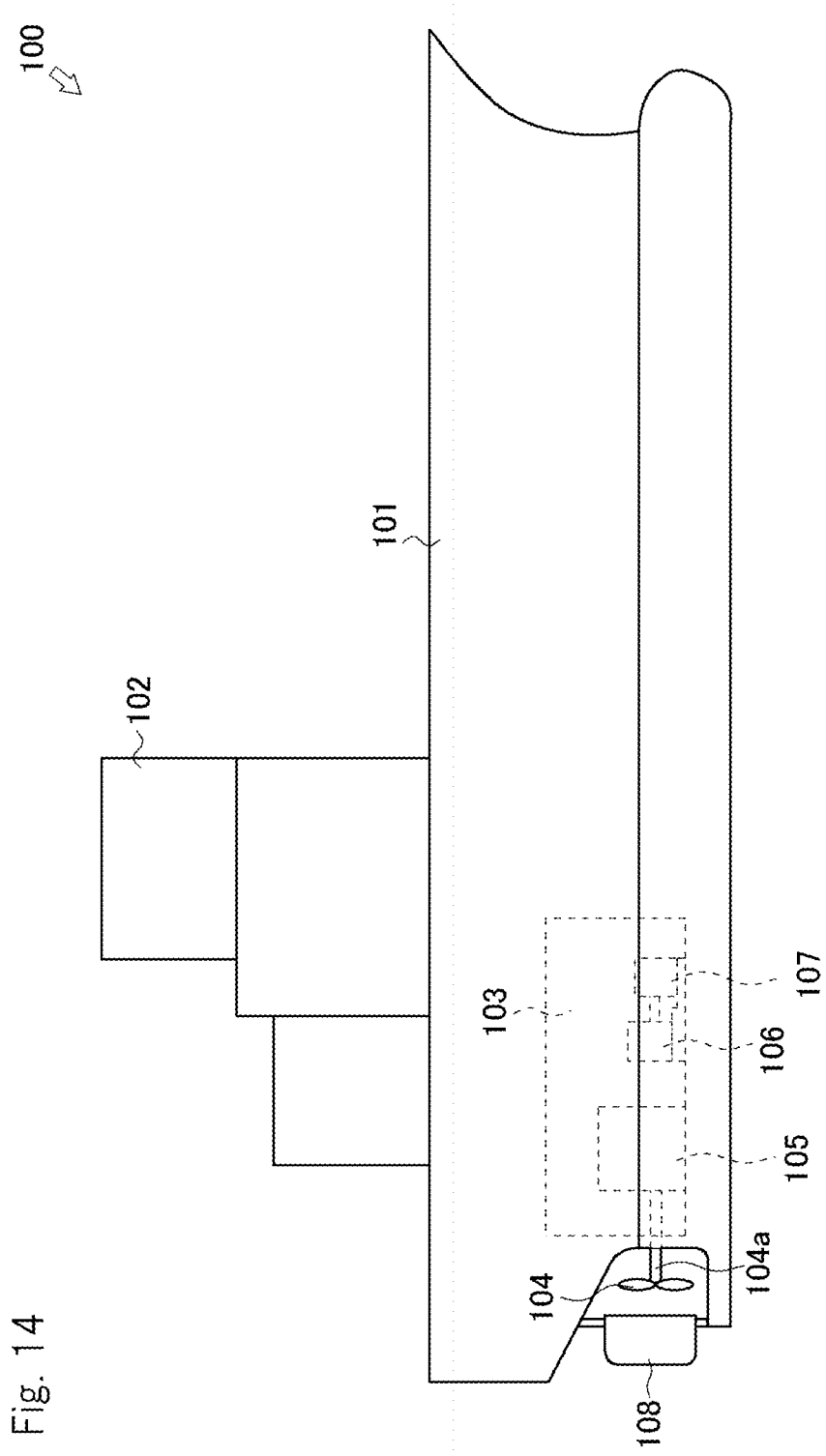
FIG. 14 is a schematic drawing of a ship on which an engine having the exhaust purifier according to the embodiment of the present invention.

Referring to FIG. 14, the ship 100 which is a first embodiment of a ship on which the engine 22 having a supercharger according to the present invention is mounted is explained.

As shown in FIG. 14, the ship 100 has a hull 101, a bridge 102, an engine room 103, a propeller 104 and a rudder 108. In the ship 100, the bridge 102 having a cockpit and the like is provided above the hull 101. In the ship 100, the engine room 103 is provided in a rear part of the hull 101. In the engine room 103, the main engine 105 which is an internal combustion engine driving the propeller 104 and the auxiliary engine 106 which is an internal combustion engine driving a generator 107 are provided. In a rear end of the hull 101, the propeller 104 and the rudder 108 are provided. In the ship 100, power of the main engine 105 can be transmitted via a propeller shaft 104a to the propeller 104.

The main engine 105 and the auxiliary engine 106 are configured by the engine 22 which is a diesel engine using light oil or heavy oil as fuel. The engine 22 drives rotatively an output shaft by mixing outside air with the fuel and burning them. The engine 22 is not limited to the diesel engine.

INDUSTRIAL APPLICABILITY

The present invention can be used for an exhaust purifier of an internal combustion engine.

DESCRIPTION OF NOTATIONS 1 exhaust purifier
12 catalyst reactor
13 casing
14 NOx catalyst
15 soot blower
16 air injection nozzle
17 injection valve

What is claimed is:

1. An exhaust purifier comprising:
a catalyst reactor comprising a housing,
a catalyst in the housing;
a source of compressed air; and
an air injection nozzle located in the housing at an upstream side of the catalyst, which injects compressed air from the source of compressed air into the housing of the catalyst reactor so as to remove dust adhering to the catalyst,
a control device configured to provide an indication of exhaust gas flow rate through the housing,
wherein the exhaust purifier is configured such that when the exhaust gas flow rate through the housing is not more than a reference exhaust gas flow rate, the compressed air is injected into the housing of the catalyst reactor through the air injection nozzle at a predetermined condition such that a sudden pressure rise generates a shock wave.

2. The exhaust purifier according to claim 1 further comprising a pressure difference sensor, wherein the pressure difference sensor is configured such that when a pressure difference of exhaust gas between an upstream side of the catalyst and a downstream side thereof is higher than a pressure difference between the upstream side of the catalyst and the downstream side thereof at an initial state at the same exhaust flow rate for not less than a reference pressure difference raising amount, the compressed air is injected into the housing of the catalyst reactor at a condition different from the predetermined condition regardless of the exhaust gas flow rate.

3. The exhaust purifier according to claim 1, further comprising an injection valve and a pressure control valve between the source of compressed air and the air injection nozzle.

* * * * *